Figure 1:
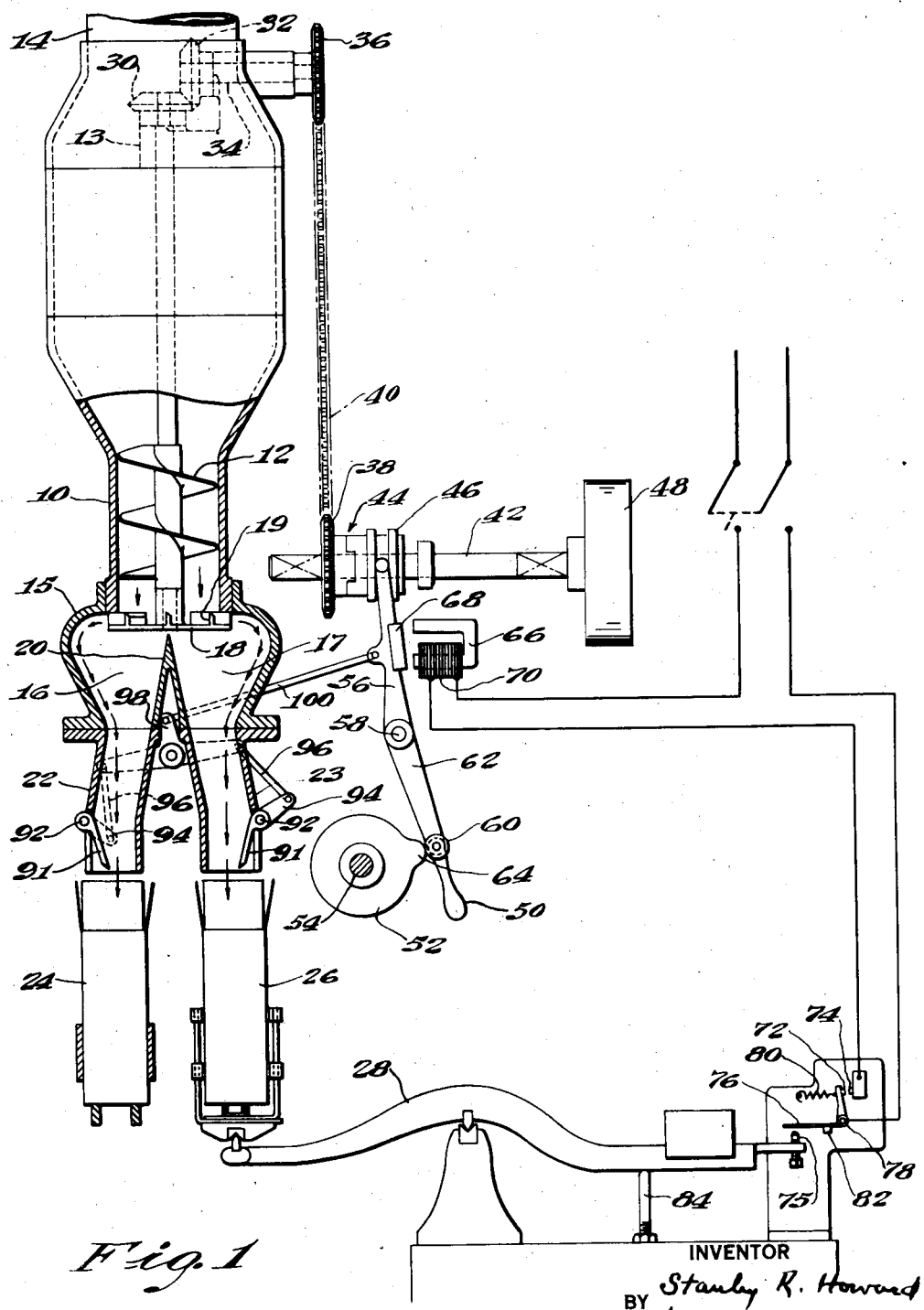

June 13, 1939.  S. R. HOWARD  2,162,219
PACKAGING AND WEIGHING MACHINE
Filed July 29, 1937

INVENTOR
Stanley R. Howard
BY J. Stanley Churchill
ATTORNEY

Patented June 13, 1939

2,162,219

UNITED STATES PATENT OFFICE 2,162,219

PACKAGING AND WEIGHING MACHINE

Stanley R. Howard, Milton, Mass., assignor to Pneumatic Scale Corporation, Limited, Quincy, Mass., a corporation of Massachusetts Application July 29, 1937, Serial No. 156,263

7 Claims. (Cl. 249—55)

This invention relates to a packaging machine.

The object of the invention is to provide a packaging machine of novel and simplified construction capable of delivering a plurality of loads of substantially equal weight and in which provision is made for dividing the stream of material to be delivered into a plurality of substantially uniform streams and for weighing the material delivered in one stream and for simultaneously cutting off the remaining streams when such weighed load reaches the predetermined amount, to the end that a plurality of loads of substantially equal weight may be delivered by the machine.

With this general object in view and such others as may hereinafter appear, the invention consists in the packaging machine and in the various structures, arrangements and combinations of parts hereinafter described and particularly defined in the claims at the end of this specification.

In the drawing illustrating the preferred embodiment of the invention, Fig. 1 is a side elevation partly in section of a sufficient portion of a packaging machine embodying the invention to enable the same to be understood.

Referring now to the drawing, the invention is illustrated as embodied in a weighing machine of the usual type now upon the market and which in general and except as to details and features to be hereinafter pointed out, may comprise the weighing machine forming the subject matter of the patent to Stanley R. Howard, No. 1,893,622 of January 10, 1933, to which reference may be had for a complete description thereof.

As herein shown the illustrated weighing machine comprises a hopper casing 10 provided with a feed worm 12 mounted in a suitable bearing 13 therein and which is designed to feed flowable solid material through the hopper at a uniform rate. The hopper 10 may be supplied with material from any source as through the supply tube 14. The material being fed from the hopper by the worm 12 is received in a casing 15 which is divided into a plurality, and as herein shown, into two sections or compartments 16, 17 by a transversely extended dividing member 20. The dividing member 20 serves the purpose of subdividing the material into two streams and provision is made for distributing the material fed by the worm 12 from the mouth of the hopper in a uniform manner so that substantially equal portions of the stream are delivered into each compartment 16, 17, and for this purpose any suitable distributing device may be mounted upon the lower end of the worm 12 and, as herein shown, a disk 18 provided with blades 19 serves upon rotation to distribute the material centrifugally and in a substantial even and uniform manner. The material from each compartment 16, 17 is then guided through spouts 22, 23 secured to the lower end thereof where it may be introduced into cartons 24, 26 disposed beneath the ends of the spouts.

In the illustrated machine one of the cartons 26 is supported upon the weighing end of a scale beam 28 of any usual or preferred weighing mechanism and preferably one such as is illustrated and described in the Howard patent, No. 1,893,622, above referred to. Provision is made for driving the feed worm 12 and for stopping the feeding of the material when the weighing operation is completed, and as herein illustrated, the upper end of the feed worm 12 is provided with a bevel gear 30 which meshes with a bevel gear 32 secured to a short shaft 34 journalled in a bearing extending from the hopper casing 10. The outer end of the shaft 34 is provided with a sprocket 36, fast thereon, connected to a sprocket 38 by a chain 40. The sprocket 38, loosely mounted on a drive shaft 42 forms the driven member of a clutch 44, the driving member 46 being slidably secured to the shaft 42. The shaft 42 may be driven through any usual or preferred means as by an electric motor, not shown, belted to a driving pulley 48 secured to the shaft 42. The driving member 46 of the clutch is arranged to be shifted, to engage the clutch either manually, as by a handle 50 or by means of a cam 52 mounted on a cam shaft 54 which may be, for the purposes of the invention, the secondary shaft shown in Fig. 5 of the patent to Howard above referred to and designated 164 in such patent. As herein shown, the clutch lever 56 is pivoted at 58 and the cam 52 cooperates with a cam roll 60 mounted in the lower arm 62 of the lever 56. In operation, as described in said Howard patent, the cam shaft 54 makes one revolution per cycle and then comes to rest, and does not start again until actuated by means controlled from the scale beam. In the present instance the high part of the cam 64 causes engagement of the clutch and then passes by the roll before it comes to rest so that the clutch is free to be disengaged by mechanism controlled by the scale beam, as will now be described.

In order to cut off the flow of material from each compartment 16, 17 when the single scale beam makes its weight, provision is made for closing shutters 90, 91 and also for stopping the operation of the feeding device, when the weight is reached in the carton being weighed. For this purpose the clutch 44 is arranged to be disengaged by an electromagnet 66. As herein shown, the lever 56 is provided with a keeper 68 which is attracted to the electromagnet 66 when a coil 70 is energized. The coil 70 is arranged to be energized when contacts 72, 74 are closed by the counterweight end of the scale beam 26. As illustrated, the counterweight end of the beam is provided with an adjustable screw 76 which engages an arm 78, pivoted at 70, to rock the contact 72 when the weight of the carton and its load reaches the desired weight. The contact 72 is normally held in its open position by a spring 80, the arm 78 resting against a stop 82. During the operation of the weighing machine, and as illustrated and described in the Howard patent, the scale beam is reset, so that it rests against the stop 84, thereby permitting the contacts 72, 74 to be opened and leaving the lever 56 free to be actuated by the cam 52.

Provision is made for closing the mouth of spouts 22 and 23, simultaneously with the stopping of the feed worm 12 and, as herein shown, shutters 90, 91 are provided in spouts 22 and 23. The shutters are operated through connections from the lever 56 and which include a pair of rock shafts 92 journalled in the spouts 22 and 23, arms 94 secured to the shafts 92, links 96, a rock lever 98, and a connecting rod 100. In operation, when the clutch 44 is disengaged, the shutters 90, 91 are closed and when the clutch is again engaged the shutters are opened.

From the description thus far it will be observed that the present invention enables increased production of loads of substantially uniform weight to be obtained in a machine embodying a lesser number and, as herein shown, only a single weighing mechanism thus simplifying the machine and reducing to a minimum its cost of manufacture.

While the preferred embodiment of the invention has been herein illustrated and described, it will be understood that the invention may be embodied in other forms within the scope of the following claims.

Having thus described the invention, what is claimed is:

1. In a packaging machine, in combination, a hopper, a driven material feeding member within the hopper, means for sub-dividing the material being fed by said driven feeding member into a plurality of substantially uniform streams, a weighing device for weighing the material in one stream, means controlled by the weighing device for terminating the flow of said plurality of streams to form a plurality of loads when the weighed load reaches a predetermined amount and connections between the weighing device and said driven feeding member for interrupting the operation of the feed member when the weighing device makes its weight whereby to produce one weighed load and at least one additional and unweighed load of approximately the weight of the weighed load.

2. In a packaging machine, in combination, material feeding means arranged to deliver flowable solid material to be packaged in a plurality of substantially uniform streams, including a driven feeding member, means for weighing one of the streams to form a weighed load, means for terminating the flow of all of the streams when the weighed load reaches a predetermined amount and connections between the weighing device and the driven feeding member for terminating the operation of the latter when the weighed load reaches a predetermined amount.

3. In a packaging machine, in combination, a hopper and a worm mounted to turn therein to feed flowable solid material therethrough and discharge it therefrom, said worm being provided at its lower end with a device for uniformly distributing the material, a separating device for separating the material into a plurality of substantially evenly divided streams to form loads, a weighing device for weighing one of said loads and operating means for simultaneously stopping the feed worm and for terminating the flow of said streams, said operating means being rendered operative by the weighing device when the weighed load reaches its weight.

4. In a packaging machine, in combination, a hopper and a worm mounted to turn therein to feed flowable solid material therethrough and discharge it therefrom, said worm having means at the lower end thereof for uniformly distributing the material, a separating device for separating the material into a plurality of evenly divided streams to form loads, a weighing device for weighing one of said loads and means including a clutch lever controlled by said weighing device for simultaneously cutting off all of said streams and for stopping the rotation of the feed worm when the weighed load reaches its weight.

5. A packaging machine having, in combination, means for feeding flowable solid material in a plurality of substantially uniform streams, a weighing device arranged to weigh the material being fed from one stream, means responsive to the operation of the weighing device for terminating the flow of said stream to form a weighed load, and means cooperating with the weighing device for substantially simultaneously terminating the flow of the material in a different stream when the weighed load is formed to thereby form an additional and unweighed load of approximately the weight of the weighed load.

6. A packaging machine having, in combination, means for feeding flowable solid material in a plurality of streams of substantially the same cross-sectional area, means for controlling the flow of each of said streams, a weighing device for weighing the flow of only one of said streams, and connections between said weighing device and said flow controlling means arranged and constructed to terminate the flow of said plurality of streams when the weighed load reaches a predetermined amount, whereby to produce one weighing load and at least one additional and unweighed load of approximately the weight of said weighed load.

7. In a packaging machine, in combination, a feed hopper adapted to contain a supply of solid flowable material, means associated with said feed hopper for sub-dividing the material as it leaves said hopper into a plurality of streams of substantially the same cross-sectional area, a weighing device for weighing the flow of one of said streams, and means controlled by said weighing device for simultaneously terminating the flow of said plurality of streams to form a plurality of loads when the weighed load has reached a predetermined amount, to thereby produce one weighed load and at least one additional and unweighed load of approximately the weight of the weighed load.

STANLEY R. HOWARD.